United States Patent [19]

Isaksen et al.

[11] Patent Number: 4,469,732

[45] Date of Patent: Sep. 4, 1984

[54] WATER DEFLECTOR FOR VEHICLE DOORS

[75] Inventors: Robert A. Isaksen, Chardon; David E. Frappier, Mayfield Hts.; Wallace R. Jones, Waite Hill Village, all of Ohio

[73] Assignee: The Excello Specialty Company, Cleveland, Ohio

[21] Appl. No.: 415,228

[22] Filed: Sep. 7, 1982

[51] Int. Cl.³ .......................... B32B 3/02; B32B 3/10
[52] U.S. Cl. .................................. 428/80; 296/39 R; 428/131; 428/187; 428/192; 428/194; 428/195; 428/337; 428/343; 428/921
[58] Field of Search ............... 428/80, 31, 131, 192, 428/195, 194, 220, 343, 337, 187, 352, 136, 43, 921; 296/39 R, 39 A, 146; 264/22; 106/18.11

[56] References Cited

U.S. PATENT DOCUMENTS

| 2,801,447 | 8/1957 | Wolinski | 264/22 |
| 3,085,024 | 4/1963 | Blackford | 428/43 |
| 3,730,942 | 5/1973 | Green et al. | 106/18.11 |
| 3,794,554 | 2/1974 | Caring | 428/343 |

Primary Examiner—Paul J. Thibodeau
Attorney, Agent, or Firm—Fay & Sharpe

[57] ABSTRACT

A water deflector for securement to the inner panel of a vehicle door to prevent water from entering the vehicle body or wetting the inner door trim panel. The deflector comprises a sheet of polyethylene peripherally shaped for covering the inner door panel, and having permanently plastic and permanently tacky pressure-sensitive adhesive on selective areas thereof for attaching the sheet to the inner door panel.

16 Claims, 4 Drawing Figures

WATER DEFLECTOR FOR VEHICLE DOORS

BACKGROUND OF THE INVENTION

This application relates to the art of water deflectors and, more particularly, to water deflectors for application to inner panels of vehicle doors.

The metal inner panel of a vehicle door has a plurality of openings and holes therein for mounting certain accessories and mechanisms in the door, and for providing access to such accessories and mechanisms. By way of example, the inner panel of a vehicle door may have openings and holes for mounting such items as window operating mechanisms, locks, and remote mirrors. Openings may also be provided for radio speakers. The door inner panels for each vehicle body style are normally provided with the same openings and holes so that all of the panels may accommodate the full range of standard and optional equipment which may be housed or included in the doors.

A decorative trim panel and arm rest are conventionally applied over the inner panel of a vehicle door and it is common to apply a water deflector over the inner door panel for substantially closing the various openings and holes therein for preventing entry of water into the vehicle body or interior door trim. Heretofore, the normal practice has been to secure a substantially waterproof paper over the inner door panel by using waterproof tape, body sealer compound, or caulking compound. A paper water deflector such as the foregoing has a propensity to tear during handling, particularly if repairs are required on the vehicle door. In addition, the various waterproof tapes, body sealer compounds, and caulking compounds are very time consuming to apply during initial assembly of the vehicle or when subsequent repairs are required. In addition, removal of the tape and breaking the bond of the sealer or caulking compound often damages the water deflector and also requires application of new sealing compound for reattaching the deflector.

It has, therefore, been considered desirable to provide an improved water deflector which would not be easily torn, and which would not require the use of tape or individual application of caulking compounds thereto for attaching same to a door inner panel.

BRIEF SUMMARY OF THE INVENTION

A water deflector for vehicle doors comprising a flat and flexible sheet of polethylene plastic material having a thickness of approximately between 6–10 mils. The polyethylene sheet is preferably transparent or slightly translucent.

The polyethylene sheet is peripherally shaped for covering the metal inner panel of a vehicle door by cooperating with a peripheral configuration on the door inner panel itself. On one face of the sheet, extending along the bottom edge thereof and over a substantial distance upwardly along the side edges thereof, a permanently plastic and permanently tacky pressure-sensitive adhesive is applied. This allows substantial sealing of the sheet along its bottom edge and along a substantial length of its side edges to corresponding flat surfaces on the door inner panel. Additional adhesive material may be applied to the sheet adjacent the upper edge thereof for holding same against the inner panel.

The plastic sheet has orientation indicia thereon in the form of an arrow or the like for indicating the upper edge portion of the sheet. In addition, the sheet may have location indicia thereon for indicating the front, rear, left, or right door to which the sheet will be applied. The plastic sheet may further advantageously include a seller or purchaser part number.

The adhesive material is preferably opaque or otherwise distinctly colored to offset same from the plastic sheet. The plastic sheet also has a plurality of spaced alignment holes therein for receiving pins to register a plurality of stacked sheets prior to die cutting of same to the desired shape. During die cutting, the plastic sheets also have a plurality of holes or slits formed therein for allowing passage of various fasteners or mechanisms therethrough from the inner door trim panel.

The sheets with the adhesive applied thereto are preferably baked in an oven at an elevated temperature to firmly bond the adhesive to the sheets, and to partially cure the adhesive.

The surface of the plastic sheet to which the adhesive is applied is preferably treated for enhancing the adhesion of the adhesive thereto. In the preferred form, the plastic sheet also includes a flame retardant and a slip agent to facilitate separation of the stacked sheets subsequent to die cutting.

It is a principal object of the invention to provide an improved water deflector for covering the inner panel of a vehicle door.

It is an additional object of the invention to provide such a water deflector with permanently plastic and permanently tacky pressure-sensitive adhesive for securing same to the door inner panel.

It is also an object of the invention to provide an improved procedure for manufacturing such water deflectors.

Still other objects and advantages for the invention will become apparent to those skilled in the art upon a reading and understanding of the following detailed description.

BRIEF DESCRIPTION OF THE DRAWINGS

The invention may take form in certain parts and arrangements of parts, a preferred embodiment of which will be described in detail in this specification and illustrated in the accompanying drawings which form a part hereof and wherein.

DESCRIPTION OF A PREFERRED EMBODIMENT

Figure 1:
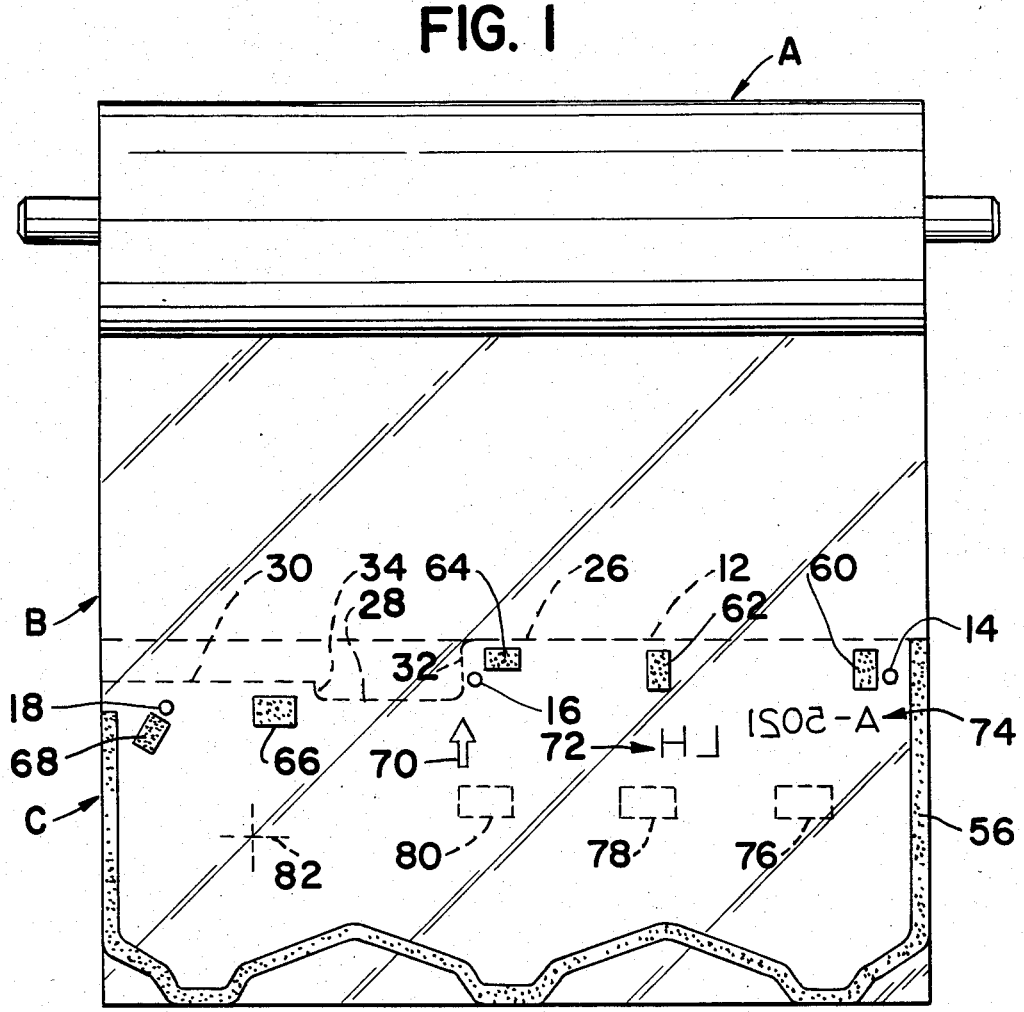
FIG. 1 is a plan view of a plastic sheet being unrolled and having an adhesive applied thereto in a predetermined configuration for use of the sheet in cut lengths as a water deflector in vehicle doors.

Referring now to the drawings, wherein the showings are for purposes of illustrating a preferred embodiment of the invention only and not for purposes of limiting same, FIG. 1 shows a roll A of plastic film being unwrapped to provide an elongated flat sheet B of synthetic plastic material. Although it will be recognized that different types of synthetic plastic material may be used for certain purposes, it has been found that polyethylene is a preferred material for the water deflector because of its high strength, flexibility, and durability. For use as a water deflector in vehicle doors, it has been found that plastic film having a thickness of approximately between 6–10 mils offers optimum strength, flexibility, and durability at minimum cost.

The plastic film preferably has a suitable flame retardant incorporated therein. The flame retardant may be any of well-known types including organic or inorganic, or combinations thereof. In addition, the plastic film preferably has a suitable slip agent incorporated therein, such as an amide wax. The slip agent facilitates separation of stacked water deflectors for installation on a vehicle door. One surface of the plastic film is also treated for modifying the surface characteristics to enhance bonding of an adhesive thereto. Although chemical and flame treatments are possible, it has been found that the corona discharge treatment is the preferred procedure and provides optimum results.

An adhesive in a liquid or semi-liquid state is applied to the treated surface of sheet B in a predetermined pattern. The adhesive is applied so it has a substantially uniform thickness which is substantially less than the thickness of sheet B. The adhesive may be of any suitable type so long as it provides substantially permanently tacky pressure-sensitive characteristics. The adhesive may be solvent based, including, but not necessarily limited to, neoprene, rubber latices or butyral phenolic.

Plastic sheet B is characterized by the absence of color or is of a color distinctly different from the color of the adhesive. Plastic sheet B is cut along line 12 to provide a water deflector blank C having the adhesive applied to the treated surface thereof. A plurality of spaced-apart registration holes 14, 16, and 18 are provided in the blank for receiving pins so that a plurality of blanks can be stacked in registration with one another for die cutting. Blanks C are baked in an oven at an elevated temperature for securely bonding the adhesive to the surface of the plastic and for partially curing the adhesive by driving off the solvent. The adhesive is then substantially permanently tacky or sticky to provide pressure-sensitive characteristics, and is tenaciously bonded to the surface of the plastic sheet.

Figure 2:
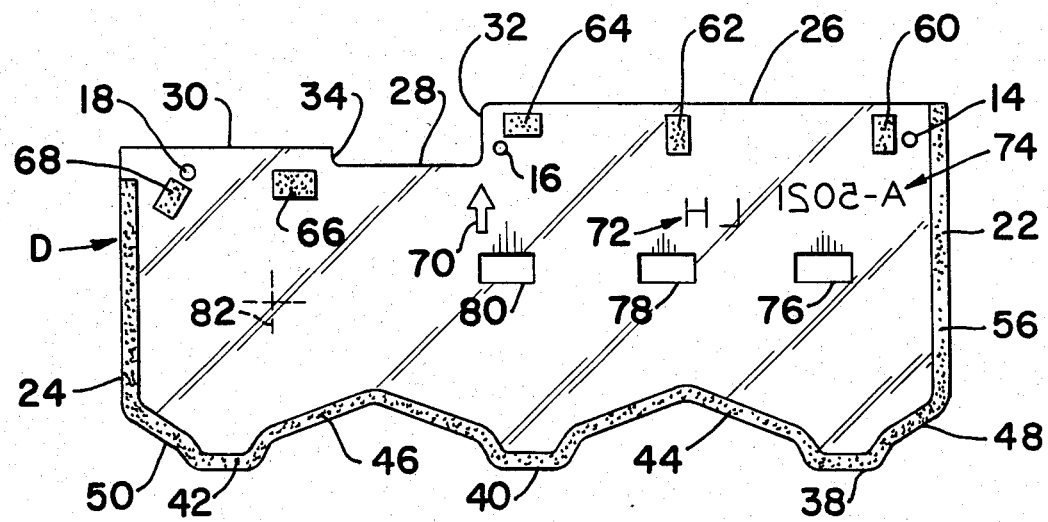
FIG. 2 is a plan view of a sheet of plastic material for use as a water deflector in a vehicle door in accordance with the invention subsequent to trimming of the plastic sheet.

Subsequent to baking, a plurality of the water deflector blanks are stacked on top of one another with the adhesive patterns on adjacent sheets being in registration with one another. The desired registration is obtained by placing the blanks onto locating pins which extend upwardly through registration holes 14, 16, and 18. The stacked blanks are then die cut to the peripheral configuration shown in FIG. 2 for defining a plurality of finished water deflectors D. It will be recognized that the shape or peripheral configuration of the water deflectors will vary depending on the particular type or style of vehicle on which it will be used. In the stack of water deflectors, the adhesive on one sheet faces the untreated surface of an adjacent sheet.

Untreated surface refers to the surface of each deflector which has not been treated for enhancing bonding of adhesive thereto. In addition, the slip agent blooms to that untreated surface so that the adhesive does not stick tenaciously to the surface of an adjacent sheet. Thus, the sheets are relatively easily separated one at a time from the stack for application to a vehicle door.

Still further, a predetermined number of deflectors, typically 25 to 50, which comprise a stack may be provided with a cardboard or like bottom sheet to form a pad-like arrangement. Individual deflectors may be removed from the pad on an as needed basis and the pad-like arrangement accommodates safe storage of the unused ones of the deflectors.

Water deflector D has generally parallel opposite side edges 22,24. The top edge of water deflector D is staggered and defined by generally parallel edges 26,28 and 30 which are vertically offset from one another. Connecting edges 32,34 connect top edges 26,28 and 28,30, respectively. The bottom edge of water deflector D is somewhat scalloped and includes a plurality of aligned spaced-apart lowermost bottom edges 38,40, and 42. Upwardly sloping bottom edge portions 44,46 connect lowermost bottom edges 38,40 and 40,42, respectively. Upwardly sloping bottom edges 48,50 connect lowermost bottom edges 38,42 with side edges 22,24, respectively.

Adhesive 56 is applied continuously along the treated surface of the sheet which forms water deflector D adjacent the bottom edge thereof and extends continuously upwardly along opposite sides edges 22,24. Adhesive material 56 extends upwardly over a major portion of the length of side edges 22,24. In the arrangement shown, the adhesive extends the full length of side edge 22 and just slightly less than the full length of side edge 24. The adhesive is applied in the form of a strip or ribbon of substantial width, preferably at least one-half inch wide. Also, adhesive 56 has a thickness substantially less than that of the plastic film and extends completely to the edges of the water deflector instead of being spaced inwardly therefrom.

Although the preferred arrangement shows adhesive in a continuous band along the bottom edge of the deflector, it is sometimes considered desirable to provide a discontinuous adhesive band therealong. This, then, provides relief areas which aid in eliminating any creases during deflector installation. In the particular embodiment of the deflector shown in the FIGURES, the areas which would not be provided with adhesive comprise lowermost bottom edges 38,40,42. These edges or flap-like areas would simply be tucked into adjacent openings in the door inner and thus provide a shingle-like effect for water penetrating the area between the door inner and door outer. Of course, the placement of the adhesive band along the deflector lower edge could be varied as necessary and/or appropriate to accommodate different door and deflector designs.

Spaced-apart generally rectangular areas of adhesive are applied to the treated surface of the water deflector sheet adjacent the top edge thereof as at, for example, the areas designated 60, 62, 64, 66, and 68. Registration holes 14 and 18 are shown as preferably being located adjacent the intersection of side edges 22,24 with the top edge of the sheet. Registration hole 16 is shown as being located adjacent the intersection of top edge 26 with connecting edge 32. Moreover, registration holes 14, 16, and 18 are all preferably spaced from the adhesive material. It will be appreciated, however, that the registration holes may be placed in other locations to suit particular needs.

Adhesive material is also advantageously applied to the treated surface of the sheet in the form of an arrow 70 to provide orientation indicia informing an installer which edge comprises the top or upper one. Adhesive may also be applied to the treated surface of the sheet in the form of location indicia 72 indicated as the letters "LH" to indicate that the water deflector is for use on a left hand door. Still further, adhesive may also be applied to the treated surface of the sheet in the form of letters and numbers 74 to identify the part number of the water deflector or the part number of the door inner with which the deflector is to be associated.

A plurality of spaced-apart openings 76,78 and 80 may be die cut in water deflector D for accommodating fasteners or the like used, for example, to secure the inner door trim panel in place. A cross slit 82 may also be die cut in the sheet for accommodating a window operator or the like. It is desirable that all inner corners of such die cut openings and intersections of edges be smoothly curved to avoid high stress concentrations which might otherwise result in undesired tearing of the sheet.

Figure 3:
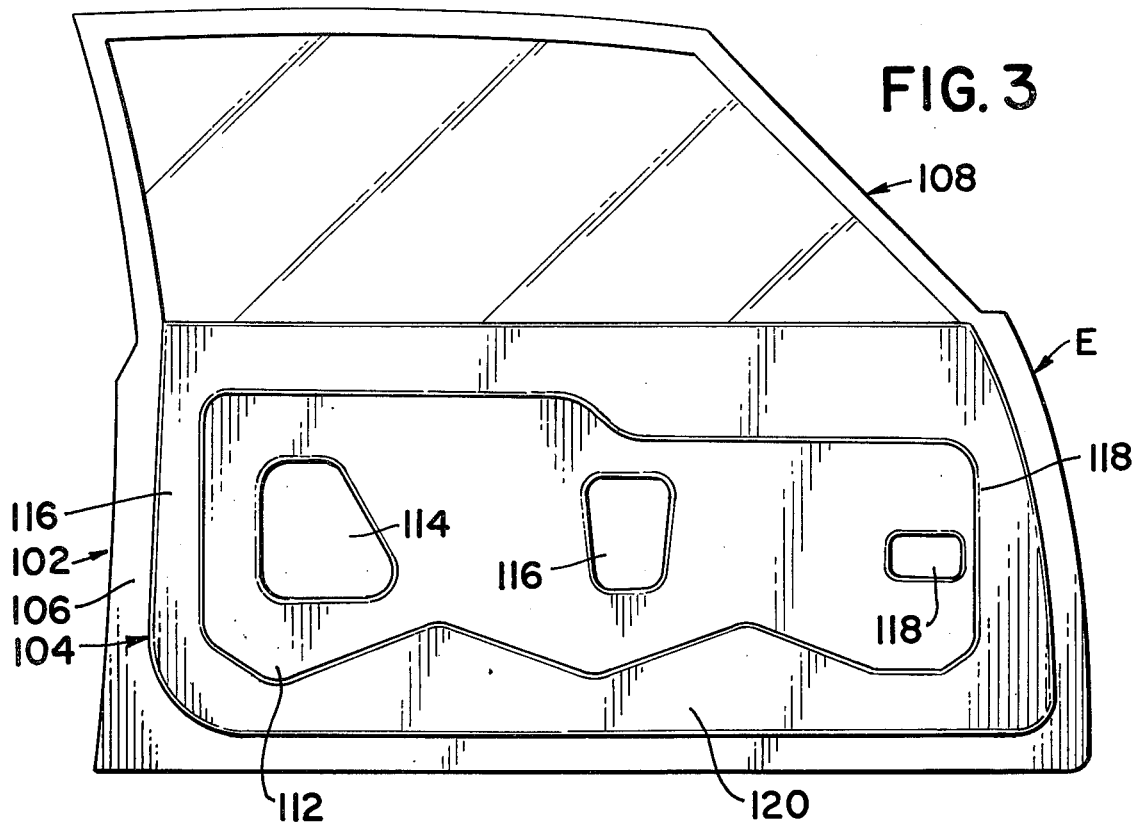
FIG. 3 is a diagrammatic elevational view of the inner panel of a vechicle door; and, FIG. 4 is a view similar to FIG. 3 showing the water deflector of FIG. 2 applied to the inner panel of the vehicle door in FIG. 3.

FIG. 3 shows a typical vehicle door E having outer and inner metal door panels 102,104 secured together with a space therebetween for accommodating various mechanisms. Only the peripheral portion of outer door panel 102 is visible in FIG. 3 at numeral 106. A window 108 is shown for door E and moves into the space defined between the inner and outer door panels in a known manner. Inner door panel 104 is stamped into an irregular or uneven contour for accommodating the mounting of various mechanisms or accessories thereon and for providing optimum strength. A dished-in area of inner door panel 104 is generally indicated at 112 in FIG. 3 and a plurality of relatively large openings 114,116 and 118 are formed therein for mounting various items or providing access to mechanisms. While three such openings have been shown by way of example in FIG. 3, it will be appreciated that a greater number are typically present. A plurality of small holes, indentations, and the like (not shown) are also normally provided in the inner door panel for accommodating screws, bolts, and other components in a known manner. At least the opposite side peripheral portions 116,118 along with the bottom peripheral portion 120 of inner door panel 104 are substantially flat and planar.

Figure 4:
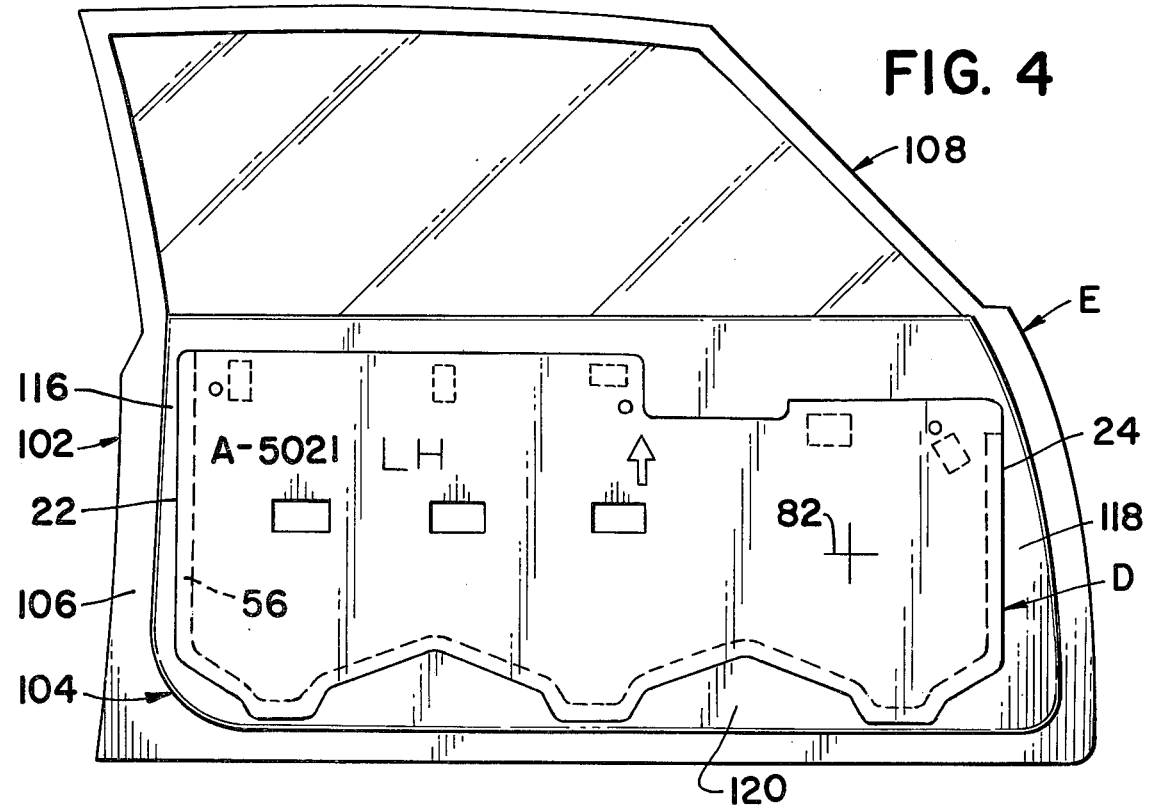

Water deflector D is peripherally shaped to substantially cover inner door panel 104 and to substantially match or cooperate with the opposite side and bottom flat peripheral portions. FIG. 4 shows water deflector D in an adhesively secured relationship to inner door panel 104. The continuous adhesive ribbon along the bottom and opposite side edges of water deflector D firmly adheres to bottom flat portion 120 and opposite flat side portions 116,118 on inner door panel 104. The upper edge of bottom flat area 120 on inner door panel 104 is scalloped where it intersects dished-in portion 112, and the scalloped bottom edge of water deflector D generally corresponds with the scalloped shape of the line at the intersection between dished-in area 112 and bottom flat area 120.

In particular application, deflector D functions to deflect water entering the space between the inner and outer door panels. The water is thus kept within the door assembly for drainage out through conventional bottom drain openings instead of entering the vehicle body or wetting the inner door trim panel. The upper edge portion of the water deflector is held to the inner door panel by the spaced adhesive areas 60, 62, 64, 66, and 68. The various adhesive indicia areas may be located to assist in holding the middle area of the deflector to the inner door panel.

Because of the special corona treating process which the plastic receives and because of the baking process which is employed after the adhesive is applied to the plastic, the adhesive tenaciously adheres to the plastic. Accordingly, and in the event the water deflector must be removed from association with the door inner panel for some reason such as making door repairs or the like, the adhesive does not have a tendency to pull away from the plastic and remain with the door inner. Rather, the adhesive remains affixed to the plastic so that the deflector may be easily reinstalled without the necessity for using any additional or new adhesive.

Although the invention has been shown and described with respect to a preferred embodiment, it is obvious that modifications and alterations will occur to others upon a reading and understanding of this specification. It is intended to include all such modifications and alterations insofar as they come within the scope of the claims or the equivalents thereof.

Having thus described the invention, it is now claimed:

1. A water deflector for application to the inner panel of a vehicle door or the like to prevent water from entering the vehicle body or wetting the inner door trim panel comprising:
   a flat and flexible sheet of plastic material having a peripheral shape generally matching the peripheral configuration of the inner panel of a vehicle door, said sheet having top, bottom, and opposite side edges, a plurality of spaced-apart pin receiving holes in said sheet generally adjacent said top edge for receiving pins to achieve registration between a plurality of like sheets stacked on top of one another, and permanently plastic pressure sensitive adhesive bonded to one face of said sheet in strips adjacent said edges, said adhesive covering a minor portion of the surface of said one face.

2. The water deflector as defined in claim 1 wherein said sheet is polyethylene.

3. The water deflector as defined in claim 2 wherein said sheet has a slip agent incorporated therein to facilitate separation of adjacent stacked sheets.

4. The water deflector as defined in claim 3 including a flame retardant incorporated in said sheet.

5. The water deflector as defined in claim 2 wherein at least said one face of said sheet is treated for enhancing the bond between said adhesive and said one face.

6. The water deflector as defined in claim 1 including indicia printed on said one face with said adhesive.

7. The water deflector as defined in claim 1 wherein said adhesive is disposed in strips adjacent said bottom edge and upwardly from said bottom edge along said side edges over a major portion of the length thereof.

8. The water deflector as defined in claim 7 wherein said adhesive is in a continuous strip adjacent said bottom edge.

9. The water deflector as defined in claim 7 wherein said adhesive is at spaced-apart intervals along said top edge.

10. The water deflector as defined in claim 1 wherein said sheet is polyethylene having a thickness of approximately between 6–10 mils.

11. The water deflector as defined in claim 1 wherein said adhesive is baked on said sheet.

12. A water deflector for application to the inner panel of a vehicle door to prevent water from entering the vehicle body or wetting the inner door trim panel through such inner panel comprising:
   a flat and flexible sheet of flexible plastic material having a peripheral shape generally corresponding with the peripheral shape of an inner panel of a vehicle door and having top, bottom, and opposite side edges, permanently plastic pressure sensitive adhesive bonded to one face of said sheet in strips adjacent said edges, and said one face being treated at least in the areas thereof having said adhesive bonded thereto for enhancing the strength of the bond between said one face and said adhesive, said adhesive covering a minor portion of the surface of said one face.

13. The water deflector as defined in claim 12 wherein said adhesive is disposed in strips adjacent said bottom edge and upwardly along said side edges over a major portion of the length thereof, and said adhesive is at spaced-apart intervals along said top edge.

14. The water deflector as defined in claim 13 wherein said adhesive is in a continuous strip adjacent said bottom edge.

15. The water deflector as defined in claim 12 wherein the entire surface of said one face is treated for enhancing bonding of adhesive thereto.

16. The water deflector as defined in claim 12 including a plurality of spaced-apart pin receiving holes in said sheet for receiving registration pins to place a plurality of superimposed sheets in registration with one another.

* * * * *

REEXAMINATION CERTIFICATE (1437th)
United States Patent [19]

Isaksen et al.

[11] B1 4,469,732

[45] Certificate Issued Mar. 26, 1991

[54] WATER DEFLECTOR FOR VEHICLE DOORS

[75] Inventors: Robert A. Isaksen, Chardon; David E. Frappier, Mayfield Hts.; Wallace R. Jones, Waite Hill Village, all of Ohio

[73] Assignee: The Excello Specialty Company

Reexamination Request:
No. 90/001,530, Jun. 20, 1988

Reexamination Certificate for:
Patent No.: 4,469,732
Issued: Sep. 4, 1984
Appl. No.: 415,228
Filed: Sep. 7, 1982

[51] Int. Cl.$^5$ .............................. B32B 3/02; B32B 3/10
[52] U.S. Cl. ................................. 428/80; 296/39.1; 428/131; 428/187; 428/192; 428/194; 428/195; 428/337; 428/343; 428/921
[58] Field of Search .................. 428/31, 80, 131, 192, 428/194, 195, 220, 43, 343, 337, 187, 136, 352, 921; 264/22; 106/18.11; 296/39 R, 39 A, 146

[56] References Cited

U.S. PATENT DOCUMENTS

| | | | |
|---|---|---|---|
| 4,285,257 | 8/1981 | Eberle et al. | 83/29 |
| 4,285,754 | 8/1981 | DiMatteo | 83/29 |
| 4,377,626 | 3/1983 | Kurowski | 428/67 |
| 4,420,520 | 12/1983 | Jones et al. | 428/42 |
| 4,532,839 | 8/1985 | Easton | 83/29 |

FOREIGN PATENT DOCUMENTS

2409669  6/1979  France.

*Primary Examiner*—Paul J. Thibodeau

[57] ABSTRACT

A water deflector for securement to the inner panel of a vehicle door to prevent water from entering the vehicle body or wetting the inner door trim panel. The deflector comprises a sheet of polyethylene peripherally shaped for covering the inner door panel, and having permanently plastic and permanently tacky pressure-sensitive adhesive on selective areas thereof for attaching the sheet to the inner door panel.

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-16 are cancelled.

* * * * *